Dec. 11, 1956 W. F. STAGGERS 2,773,566
AUTOMATIC HITCH
Filed June 8, 1953 2 Sheets-Sheet 2
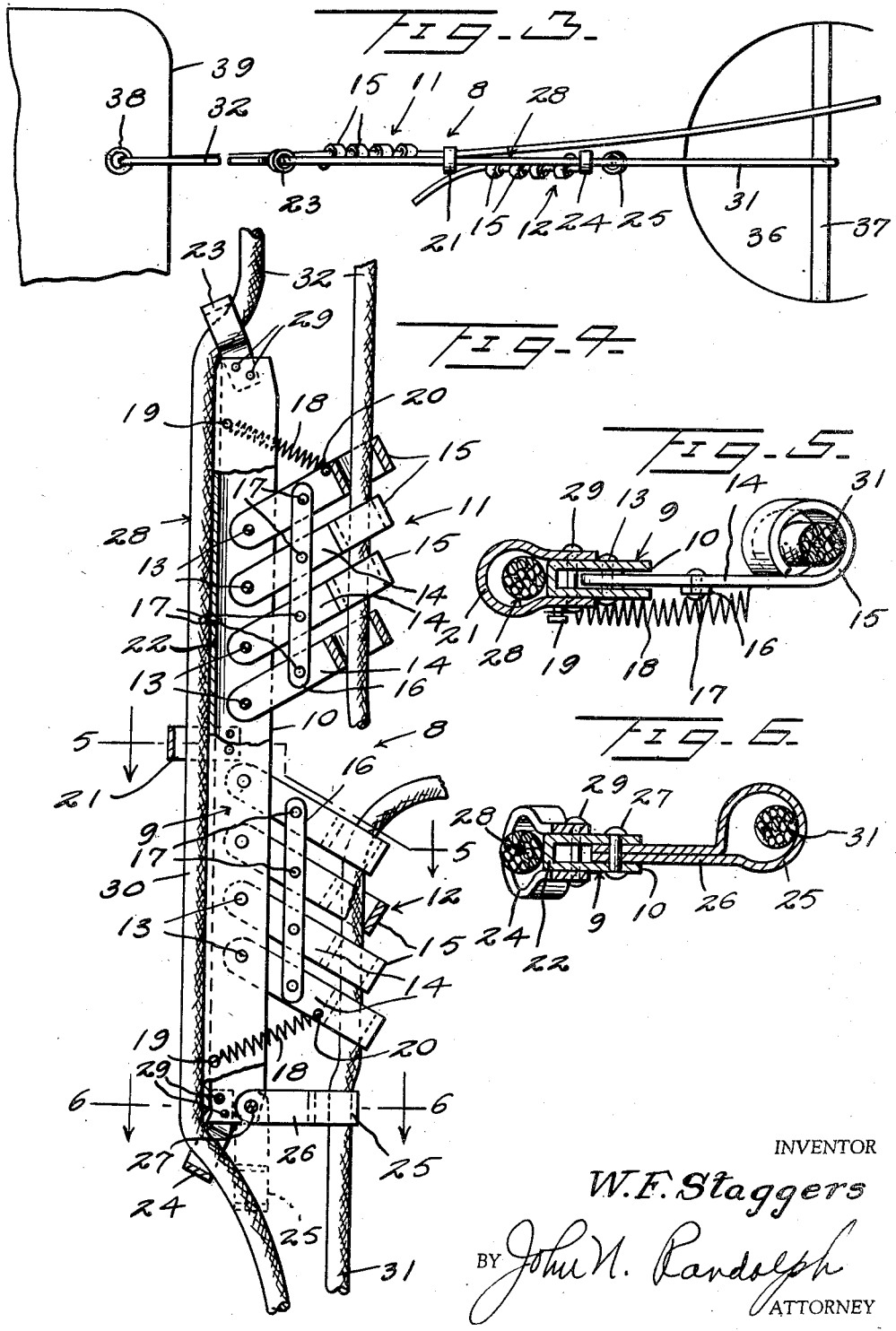
INVENTOR
W. F. Staggers
BY John N. Randolph
ATTORNEY

# United States Patent Office 2,773,566
Patented Dec. 11, 1956

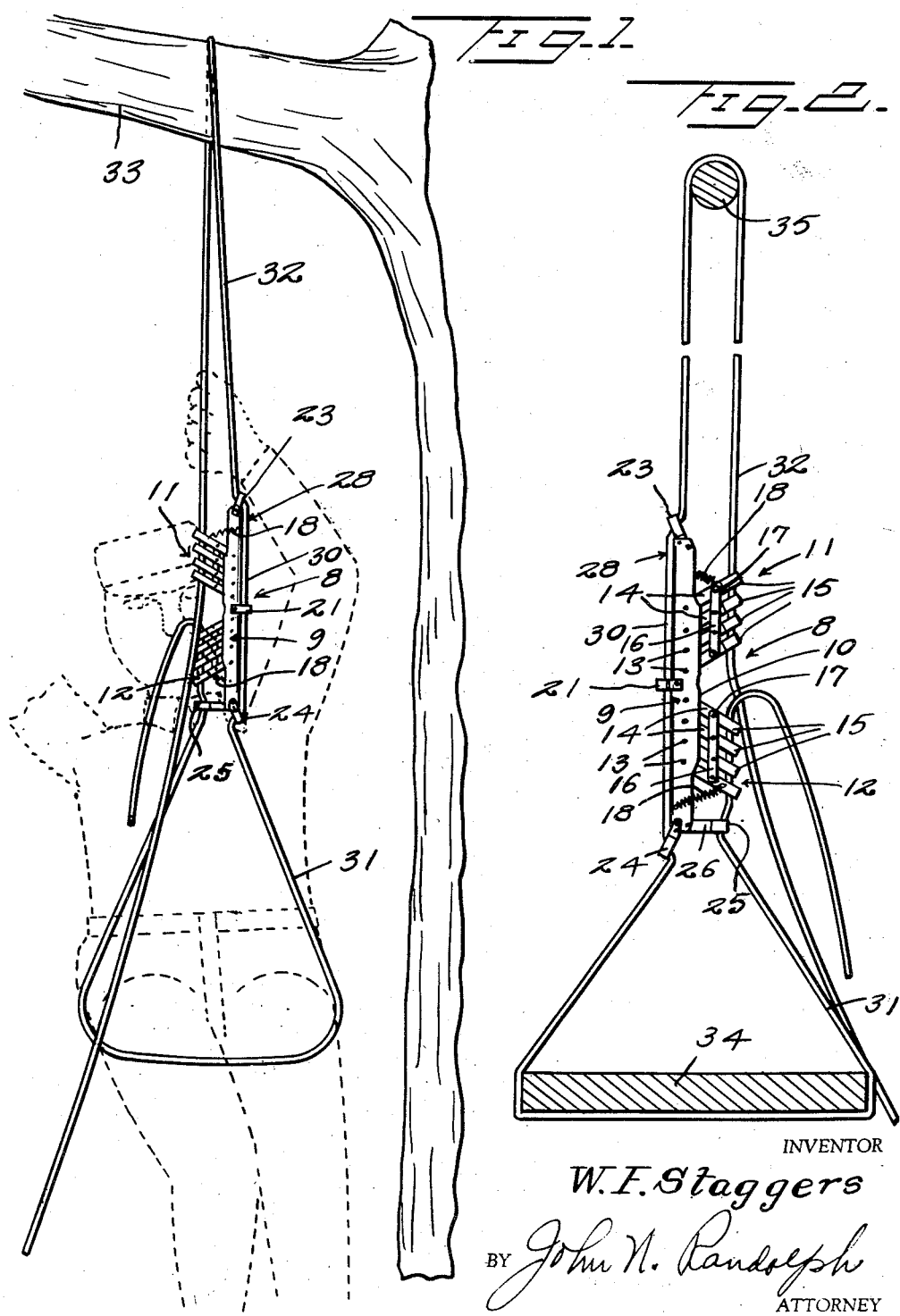

2,773,566

AUTOMATIC HITCH

William F. Staggers, Waynesburg, Pa.

Application June 8, 1953, Serial No. 360,247

2 Claims. (Cl. 188—65.1)

This invention relates to a novel automatic hitch and constitutes an improvement on my prior patents, Nos. 2,034,841 and 2,157,639.

It is a primary object of the present invention to provide an automatic hitch of extremely simple construction constituting a complete unit in itself and which in association with a single cable, line or rope may be employed for numerous purposes such as for supporting a workman from a tree limb while trimming a tree or performing other operations; supporting an end of a scaffold platform; a child's swing support, and a readily adjustable anchoring means for numerous uses such as anchoring down an aircraft on a runway or carrier deck.

More particularly, it is an aim of the present invention to provide an automatic hitch whereby the user may readily raise or lower himself while supported by a single length of cable, line or rope which is anchored to the hitch or whereby a workman standing on a scaffold platform, suspended by two lines or cables, to each of which one of the hitches is attached, may raise or lower the scaffold platform while supported thereon.

A further object of the invention is to provide a hitch of extremely simple construction which will eliminate the need for tying knots or hitches in cables, lines or ropes and which is so constructed that irrespective of how much pull is exerted thereon by a suspended load, the line or cable may be readily released and either taken in or slacked off to suit varying requirements of the user.

Another object of the invention is to provide an automatic hitch in which end portions of a cable or line are adjustably anchored without the use of knots, hitches or the like and through which an intermediate portion of the cable or line extend for maintaining the hitch in a desired location relatively to said intermediate portion while a load is suspended therefrom.

Still a further object of the invention is to provide a hitch including a safety element for use under certain load conditions to afford a means to positively prevent slippage of the line or cable relatively to the anchoring unit for the hitch.

Various other objects and advantages of the invention will hereinafter become more fully apparent from the following description of the drawings, illustrating a presently preferred embodiment thereof, and wherein:

Figure 1 is a view substantially in side elevation showing the hitch employed in conjunction with a single length of line or cable for supporting a workman at a desired elevation beneath a tree limb or the like from which the line or cable is suspended;

Figure 2 is an enlarged fragmentary side elevational view, partly in section, showing the same arrangement of the line and hitch, but looking toward the opposite side of the hitch and with the unit illustrated as it will appear when utilized for adjustably supporting an end of a scaffold platform;

Figure 3 is a plan view showing the hitch employed with a line for anchoring down an aircraft and showing the automatic hitch as it appears in edge elevation or looking from left to right of Figure 2;

Figure 4 is an enlarged side elevational view, partly in longitudinal section, of the hitch, and Figures 5 and 6 are enlarged cross sectional views thereof taken substantially along planes as indicated by the lines 5—5 and 6—6, respectively, of Figure 4.

Referring more specifically to the drawings, the automatic hitch in its entirety and as best illustrated in Figures 4, 5 and 6 is designated generally 8 and includes an elongated base member or bar, designated generally 9, which is preferably folded lengthwise thereof and midway of its side edges to provide a channel shaped construction, as illustrated in the drawings, having an open side 10.

The automatic hitch 8 includes two longitudinally spaced sets of anchoring units, designated generally 11 and 12 which are preferably of identical construction. Each of said anchoring units 11 and 12 includes a plurality, preferably four rigid strips or arms 14 having complementary ends disposed in the channels of the bar of base 9, adjacent one end thereof. Said ends of the arms 14 are pivotally connected to the bar 9 by pivot elements 13 which are spaced equal distances apart for locating the aforementioned inner ends of the arms or strips 14 in equally spaced apart relationship to one another. The opposite, outer ends of the arms or strips 14 terminate in corresponding loops or eyes 15 which are spaced outwardly from the open edge 10 of the base 9, through which said arms 14 loosely extend. The arms 14 of each anchoring unit 11 and 12 are connected intermediate of their ends by a rigid link 16 which is connected by pivot elements 17 to each of said arms 14 at points spaced from the pivots 13 and loops 15. As illustrated in Figure 4, the link pivots 17 are located equal distances apart so that the arms or strips 14 of each anchoring unit are maintained in parallel relationship by the link 16 thereof in different positions of swinging movement of the anchoring unit relatively to the base or bar 9. Each of the anchoring units 11 and 12 additionally includes spring means for urging said anchoring unit to swing toward the end of the bar 9 located adjacent thereto and away from one another. Any suitable spring means for this purpose may be provided such as pull springs 18 which are shown anchored at 19 to the bar 9 adjacent the ends thereof and connected to the remote arms or strips 14 of the two anchoring units at 20 adjacent the loops or eyes 15 thereof.

The automatic hitch 8 also includes an intermediate stationary guide loop 21 which is secured to the bar 9 and projects outwardly from the closed or back edge 22 thereof. A stationary end loop 23 is secured to and projects obliquely from one end of the bar 9 and a stationary end loop 24 is secured to and projects obliquely from the other end of said bar 9. The loops 23 and 24 extend outwardly at an angle to the longitudinal axis of the bar 9 from the ends thereof in directions away from the intermediate loop 21, so that said end loops are disposed at an obtuse angle to one another and at an acute angle to the intermediate loop 21.

A safety loop 25 is formed by the outer end of an arm or strip 26, the inner end of which is swingably mounted by a pivot element 27 in the end of the bar or base 9 from which the stationary end loop 24 extends, as best illustrated in Figures 4 and 6.

The automatic hitch 8 as previously described is adapted to be utilized with a single length of cable, line or rope 28 which may be of any desired length, a portion of which, spaced from the ends thereof, passes through the stationary loops 23, 21 and 24, as best illustrated in Figure 4. Said stationary loops are suitably anchored to the base or bar 9 as by fastenings 29. While the cable or line portion 30 which engages the loops 23, 21 and 24 and along the back edge 22 of the base or bar 9 will be referred to as the intermediate portion of the cable or line, said portion may be located substantially nearer one end of the line or cable than the other end thereof, as illustrated in Figures 1 and 2.

Assuming that the line or cable 28 in conjunction with the hitch 8 is to be used as illustrated in Figure 1 for supporting a workman on a tree limb or other overhead support, while performing such operations as trimming a tree, one end of the cable or line 28 which extends from the lower stationary loop 24 and which is designated 31, has its terminal portion passed back through the safety loop or eye 25 and thence upwardly through the loops or eyes 15 of the lower anchoring unit 12 after said unit has been swung upwardly to position the arms or strips 14 substantially at right angles to the axis of the bar 9 and so that the loops or eyes 15 of said unit 12 will be in alignment. By then releasing the unit 12, its spring 18 will swing the arms 14 back to their angular positions of Figure 1 and relatively to the axis of the bar 9 so that the portion of the cable or line end 31 passing through said loops or eyes 15 will be clamped therein and any downward pull thereon will merely tend to swing the arms 14 further toward positions parallel to the axis of the bar 9 or downwardly, to more effectively clamp the line or cable in the eyes or loops 15 thereof. The other end portion 32 of the line or cable 28 is passed or thrown over a tree limb or other overhead support 33 and the free end thereof is passed downwardly through the eyes or loops 15 of the upper anchoring unit 11 after the arms 14 of said unit have been swung to positions substantially perpendicular to the axis of the bar 9, and when the anchoring unit 11 is released its spring 18 will return the arms 14 thereof to their upwardly inclined positions, as illustrated in Figure 1, for clamping a part of the line or cable portion 32 in the loops 15 of said unit 11. The loop formed by the line or cable portion 31 provides a seat or support for the workman, as illustrated in dotted lines of Figure 1, which may be adjusted to any desired size to suit the workman by pulling the line or cable portion 31 upwardly or inwardly through the anchoring unit 12 or releasing it therefrom. The other end portion or loop 32 suspends the workman on the overhead support or limb 33, and the workman can raise or lower himself as he desires to reach different positions for accomplishing his work. For example, if the workman desires to raise himself he grasps the line portion 32 with one hand above the anchoring unit 11 and with the other hand below said anchoring unit and pulls downwardly with both hands to lift his weight otherwise from the hitch 8 and so that the downwardly extending end of the line or cable 32 which extends through the unit 11, may be pulled downwardly therethrough. By repeating this operation, the workman can elevate himself as high as he desires below the limb or support 33. Similarly, by grasping the line or cable portion with one hand above the anchoring unit 11 and pulling downwardly thereon and at the same time grasping the unit 11 with the other hand to swing it downwardly to a position perpendicular to the axis of the bar 9, the line portion 32 can be payed outwardly and upwardly through said anchoring unit 11 and in this manner the workman can lower himself while suspended by the cable 28 and hitch 8. The two stationary end loops 23 and 24 will frictionally grip the cable portion 30 while the cable 28 is held under tension to effectively prevent the cable portion 30 from sliding relatively to the bar or base 9. The safety loop 25 will prevent the line or cable portion 31 from being spread laterally directly below the lower anchoring unit 12. Without the safety loop 25, the loop formed by the line or cable end 31 may be spread laterally sufficiently so that it will exert a lateral outward pull against the lower loop 15 of the anchoring unit 12 and which will tend to swing said anchoring unit upwardly toward a position perpendicular to the axis of the bar 9 and in which position the line or cable end 31 would be released from clamping engagement in the eyes or loops 15 and would be allowed to slip outwardly or downwardly therethrough. However, with the safety loop 25 in engagement with the line or cable portion 31, said line or cable portion passes straight down from the anchoring unit 12 and may not be drawn outwardly laterally with respect thereto so that this risk of release of the line end 31 from the hitch 8 is eliminated by the safety loop 25.

It will also be apparent that the anchoring units 11 and 12 will function without the springs 18 as the pull on the end portions of the line or cable will cause said anchoring units to be swung away from one another and to their positions of Figure 1. However, the springs 18 provide an additional safety feature in that said springs will always immediately return the anchoring units to their line or cable clamping positions of Figure 1.

Figure 2, which shows the opposite side of the hitch 8 to the showing of Figure 1, illustrates a similar arrangement of the hitch with the line or cable 28 except that the hitch and cable are employed for suspending one end of a scaffold platform or board 34 which is engaged in the loop formed by the cable or line end 31. The cable or line end 32 engages over a horizontal support 35, such as a ladder rung, and it will be readily apparent that the opposite end of the scaffold platform or board 34 is similarly supported by another hitch 8 and cable or line 28. The arrangement of the line or cable portions relatively to the hitch 8 are the same as previously described in reference to Figure 1, and a further description thereof is considered unnecessary. However, here as in the description of Figure 1, a workman or workmen standing on the scaffold board 34 may raise the board at each end thereof by pulling the cable or line end 32 downwardly through the upper anchoring unit 11.

It will also be apparent that a relatively narrow board of a length corresponding to the width of the board 34 could be utilized in the loop of the line portion 31 as illustrated in Figure 1 to form a seat for the workmen and that this same arrangement could be employed for forming a swing seat with the line or cable 28 and hitch 8 constituting the remainder of the swing and which could be suspended in the same manner as illustrated in Figure 2, or as illustrated in Figure 1 at a sufficient distance from the tree trunk or nearest upright member.

The combination may also be utilized as an anchoring unit in various ways, as for example for anchoring down aircraft. Figure 3 illustrates a recess formed in an aircraft runway or carrier deck in which recess 36 the ends of a rod or bar 37 are anchored. The cable or line end 31 is passed under the anchoring rod or bar 37 and thence back through the eyes 15 of the bottom anchoring unit 12, as previously described. In this arrangement the safety eye or loop 25 is not required as the two reaches of the cable end 31 are disposed close together. With the hitch 8 previously adjusted and the cable or line portion 30 located at a convenient height to a man standing on the runway or carrier deck, the other cable or line end 32 is passed through an eye or opening 38 in a portion of an aircraft wing 39 which may be located at any desired height above the anchoring rod 37, as for example twenty to thirty feet. The return reach of the cable end 32 is then passed downwardly through the clamping eyes 15 of the anchoring unit 11. By pulling on the terminal ends of the cable or line portions 31 and 32 the cable 28 can be tightened to any desired extent. Furthermore, the cable 28 can be quickly released by merely swinging one of the anchoring units 11 or 12 toward a position perpendicular to the axis of the bar 9 for slacking off one or the other cable ends 31 or 32, after which the terminals of both of said ends may be quickly released from the anchoring units 11 and 12 for disengaging the cable from the eye 38 and anchoring bar 37.

Various other uses of the automatic hitch 8 with a line or cable will be readily obvious and it will also be readily apparent that various modifications and changes in the structure of the automatic hitch may be resorted to without departing from the spirit or scope of the invention as hereinafter defined by the appended claims.

I claim as my invention:

1. A device of the character described comprising a single length of cable or line and an automatic hitch, said hitch comprising an elongated base member, a pair of anchoring units pivotally connected to said base member in longitudinally spaced apart relationship to one another for swinging movement longitudinally of the base member toward and away from one another, each of said anchoring units including a plurality of rigid strap members each pivoted to the base member and each having a line or cable clamping eye at the end thereof disposed remote from said base member, said clamping eyes of each anchoring unit being disposed in alignment when the strap members thereof are disposed perpendicular to the longitudinal axis of the base member for receiving the ends of the line or cable, said clamping eyes of the two anchoring units being swingable away from one another by frictional engagement with the cable ends when said cable ends are pulled away from one another and away from the ends of the automatic hitch for swinging said clamping eyes out of alignment with one another and into frictional gripping engagement with said cable ends, and a plurality of stationary loops fixed to and projecting from the base member and laterally spaced from said anchoring units and through which an intermediate portion of the line or cable extends for cooperation with said anchoring units to form an adjustable loop in each end portion of the line or cable beyond each end of the automatic hitch, said stationary loops including a pair of end loops extending from said base member at oblique angles to the longitudinal axis thereof and disposed beyond the ends of the base member for frictionally gripping the line or cable to prevent said intermediate portion thereof from sliding relatively to the automatic hitch while the looped end portions are under tension and to permit the line or cable to be readily adjusted relative to the stationary loops when the looped end portions of the line or cable are not under tension.

2. A device as in claim 1, and a safety loop connected to one end of the base member beyond the anchoring unit disposed adjacent said base member end and through which the cable end, engaging said anchoring unit, passes, to prevent the strap members of said adjacent anchoring unit from being swung toward positions perpendicular to the axis of the base member by a lateral pull on said last mentioned cable end relatively to the longitudinal axis of the automatic hitch, said safety loop being pivotally connected to the base member for swinging movement in a plane corresponding to the plane of swinging movement of said anchoring units.

References Cited in the file of this patent
UNITED STATES PATENTS

| | | |
|---|---|---|
| 423,312 | Clark | Mar. 11, 1890 |
| 593,256 | Velie | Nov. 9, 1897 |
| 1,961,081 | Schrader | May 29, 1934 |
| 2,034,841 | Staggers | Mar. 24, 1936 |
| 2,157,639 | Staggers | May 9, 1939 |